Oct. 11, 1927.　1,645,018
J. H. O'NEIL
AUTOMATIC CAN TESTING MACHINE
Original Filed Feb. 27, 1925　4 Sheets-Sheet 2
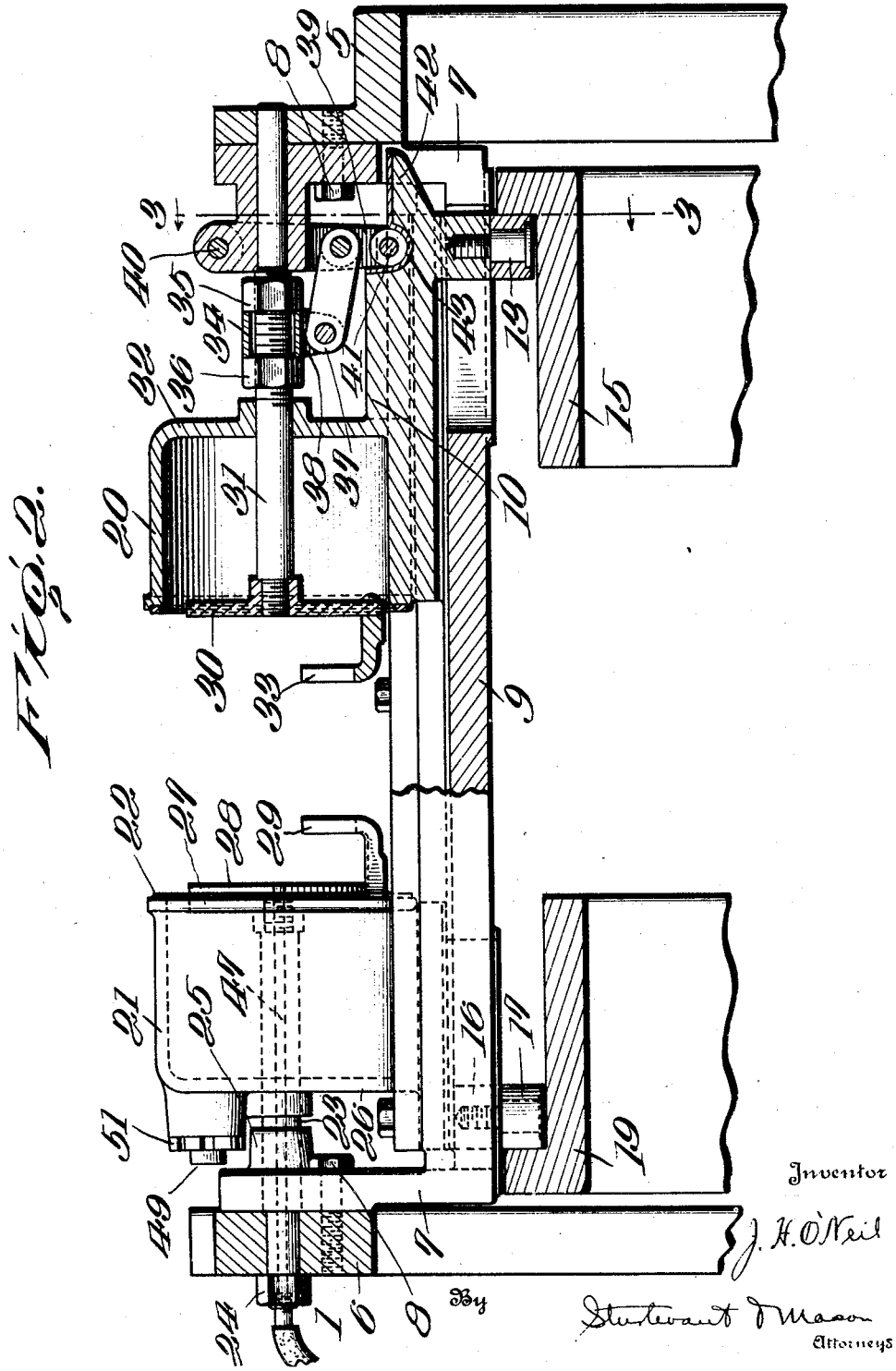

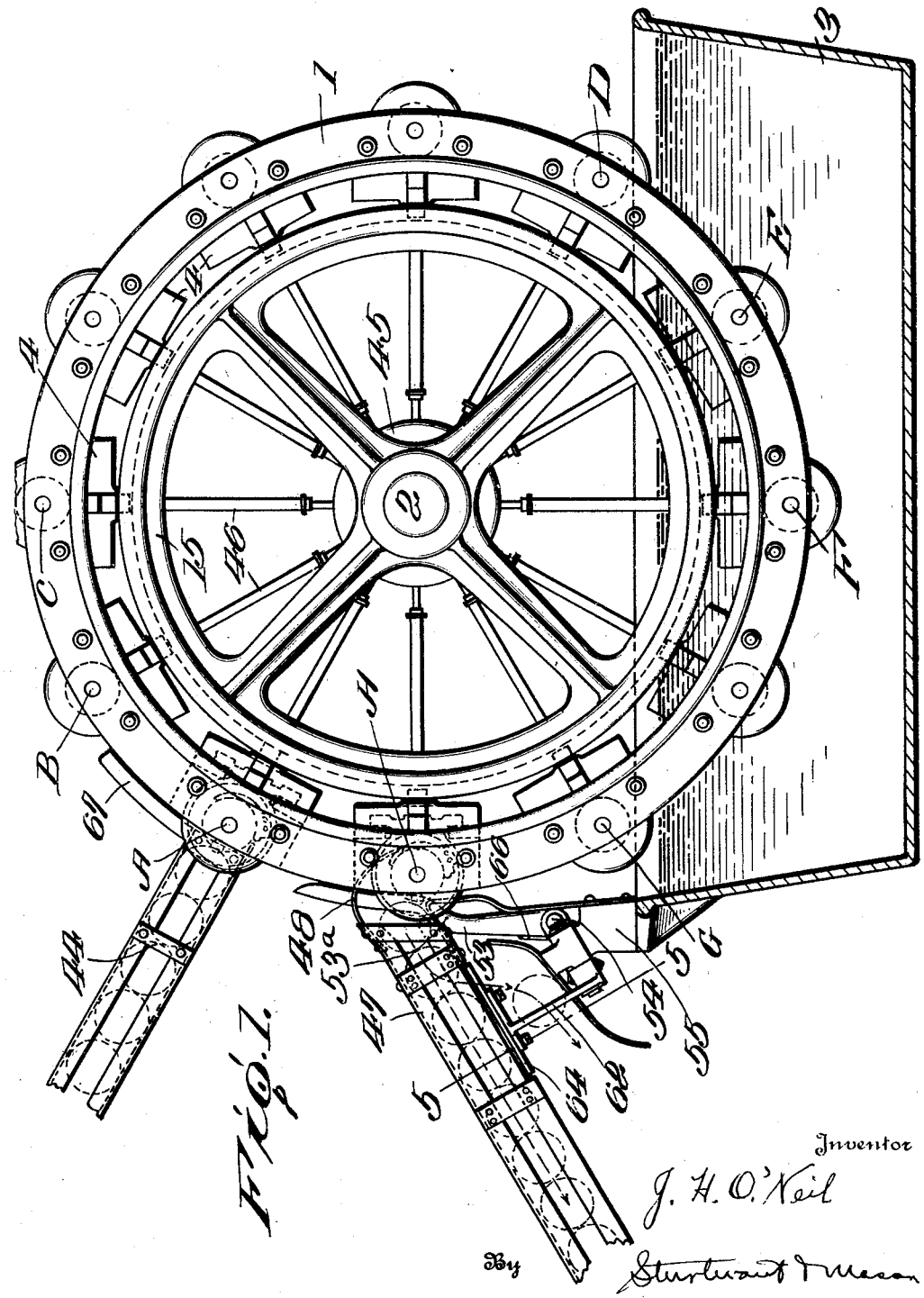

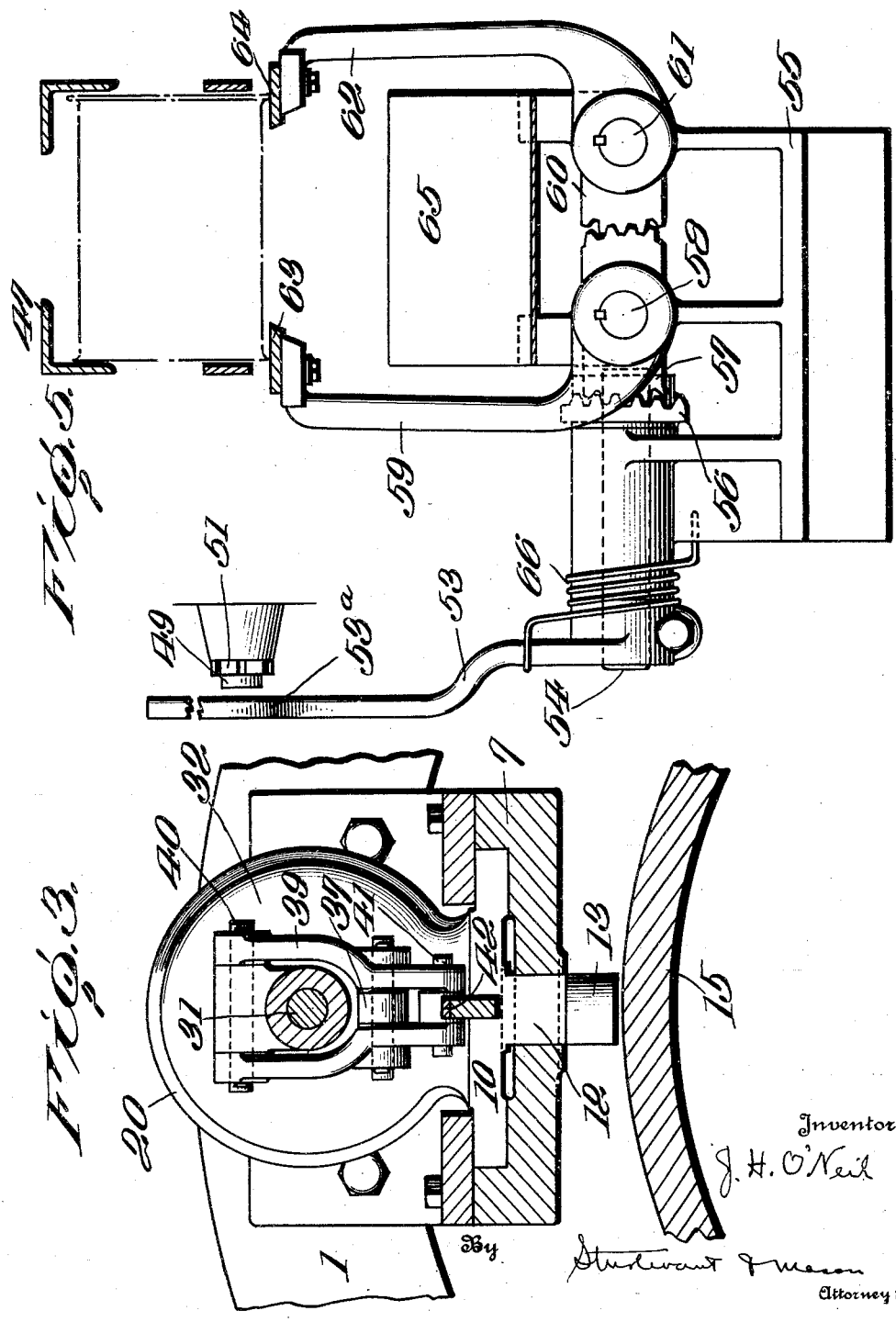

Oct. 11, 1927.
J. H. O'NEIL
1,645,018
AUTOMATIC CAN TESTING MACHINE
Original Filed Feb. 27, 1925    4 Sheets-Sheet 4
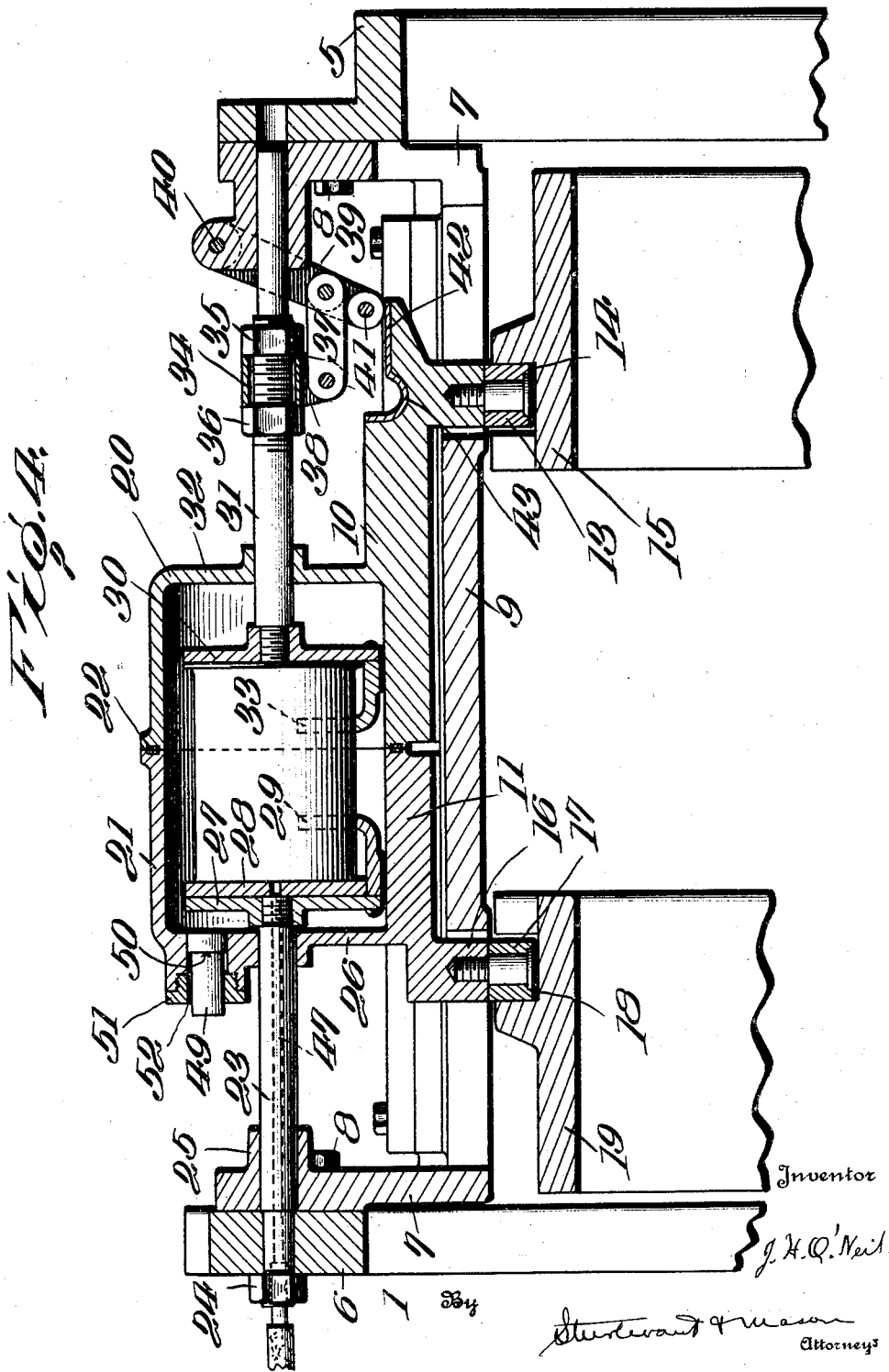
Inventor
J. H. O'Neil
By
Sturtevant & Mason
Attorneys Patented Oct. 11, 1927.

1,645,018

UNITED STATES PATENT OFFICE.

JAMES H. O'NEIL, OF SYRACUSE, NEW YORK, ASSIGNOR TO CONTINENTAL CAN COMPANY, INC., OF NEW YORK, N. Y., A CORPORATION OF NEW YORK.

AUTOMATIC CAN-TESTING MACHINE.

Application filed February 27, 1925, Serial No. 11,991. Renewed March 2, 1927.

The invention relates to new and useful improvements in automatic can testing machines and in a new method of testing cans.

An object of the invention is to provide an automatic testing machine wherein the cans to be tested are placed under air pressure, and the air escaping through a leak in a can operates, through the pressure thereof transmitted through a non-compressible fluid surrounding the can, devices for separating automatically the leaky cans from the perfect cans.

Another object of the invention is to provide a machine of the above character wherein the can to be tested is enclosed within a chamber having a non-compressible fluid entirely surrounding the can being tested, and having means associated therewith operated by the pressure of the air escaping through a leak transmitted through said fluid to operate mechanism for automatically separating the leaky cans from the perfect ones.

Still another object of the invention is to provide a rotary carrier with a series of testing devices in which the cans to be tested are placed in and entirely surrounded by a non-compressible fluid so that the pressure of air escaping through a leak transmitted through said fluid may operate a device mounted on the carrier so as to project said device into the path of mechanism for controlling the runways for the cans leaving the testing machine so that the leaky cans will pass through one runway while the perfect cans pass through another.

A further object of the invention is to provide a new method of testing cans wherein air under pressure escaping through a leak in a can may create a pressure, which pressure is communicated through a non-compressible fluid to the devices which automatically separate the leaky cans from the perfect ones.

These and other objects will in part be obvious and will in part be hereinafter more fully disclosed.

In the drawings, which show by way of illustration one embodiment of the invention:—

Figure 1 is a view, partly in side elevation and partly in section, showing a machine embodying the improvements;

Fig. 2 is a sectional view showing one of the parts of the testing chamber in section and the other in side elevation;

Fig. 3 is a sectional view on the line 3—3 of Fig. 2;

Fig. 4 is a view similar to Fig. 2, but showing both parts of the chamber section and the parts brought together to enclose the can for testing;

Fig. 5 is a sectional view on the line 5—5 of Fig. 1, and also showing one of the plungers for moving the tracks to release leaky cans.

The invention is directed broadly to a can testing machine for testing open-ended cans to determine whether the cans are perfect or whether they have small imperfections which result in a leaky can.

The testing machine includes a rotating carrier having a series of testing devices, each of which includes means for supporting the can to be tested and for closing the open end thereof; also a sectional chamber for closing about said can after it is mounted in its supporting means, said sectional chamber, however, remaining open while the mounted can, together with the chamber, passes into a fluid bath, preferably of water, so that the chamber will be filled with the water and the can to be tested surrounded thereby.

In one wall of this chamber there is a plunger which may be moved so as to project from the outer face of the chamber or be substantially housed in the wall of the chamber. The can, after it is mounted in its support, is subjected to air pressure, and any air escaping through a small leak will create a pressure in the non-compressible fluid outside of the can but within the sectional chamber, which pressure is transmitted by the fluid so as to operate upon the plunger and force the plunger outwardly to the limit of its movement. This plunger is in turn used as the carrier rotates for operating devices for separating the leaky cans from the perfect ones.

Referring more in detail to the drawings, the invention includes a rotating carrier 1 which rotates about an axis 2. Said carrier is mounted so that during its travel the peripheral portion thereof passes through a tank 3 which is filled preferably with water or some other non-compressible fluid. This rotating carrier has a series of testing devices indicated at 4.

The carrier 1 includes two end members 5 and 6, see Fig. 4. Each testing device includes a supporting bracket 7 which extends from one end member 5 to the other end member 6, and is bolted to these end members by suitable bolts 8. This bracket 7 includes a body portion 9 and outwardly extending members through which the bolts 8 pass. Mounted on this body portion 9 are two sliding devices or members 10 and 11. The body portion 9 is provided with a recess in its outer face in which these members 10—11 slide.

Attached to the member 10 and depending therefrom is a stud 12 carrying a roller 13 which runs in a cam groove 14 formed in a stationary cylindrical member 15. This stationary member 15 is suitably mounted on the supporting frame for the carrier. The member 11 is provided likewise with a depending stud 16 which carries a roller 17 running in a cam groove 18 in a stationary cylindrical member 19. These cam grooves are so shaped as to move the sliding devices 10 and 11 toward and from each other. In Fig. 4 they are shown as brought to a meeting position, while in Fig. 2 they are shown as separated.

The member 10 carries one half of the testing chamber, which is indicated at 20, and the member 11 carries the other half, which is indicated at 21. The adjacent faces of these members and the adjacent faces of the slides 10 and 11 are provided with a rubber gasket 22 so that, when the parts are moved into contact, as shown in Fig. 4, the chamber formed thereby will be hermetically sealed.

A rod 23 is mounted in the frame member 6 and secured therein by means of a nut 24. The bracket 7 has an inwardly projecting collar 25 to aid in the supporting of this rod. The rod 23 projects through the end wall 26 of the testing chamber and carries at the inner end a chuck plate 27 provided with an elastic pad 28. Said chuck also carries a can support 29. This can support is curved and shaped so as to receive and support the cylindrical can body as it enters the carrier and holds it until properly clamped against the elastic pad 28.

Cooperating with the chuck 27 is a movable chuck 30 carried by a rod 31 which extends outwardly through the end wall 32 of the testing chamber. Said rod 31 is also freely mounted in the bracket 7 and end member 5. This chuck 30 engages the bottom of the can and forces the open end of the can against the elastic pad 28. The movable chuck 30 likewise has a can supporting member 33 similar to the can supporting member 29 and which cooperates with said member 29 in supporting the can until the movable chuck 30 has clamped the open end of the can against the elastic pad, and this supports the can.

As above noted, the rod 23 is stationary, although the member 11 and the section of the chamber carried thereby move endwise of the rod 23. The rod 31 has a limited movement in an endwise direction, but except for said endwise limited movement it is stationary, and the slide 10 together with the wall 32 of the chamber carried thereby moves endwise of this rod 31. Of course, the testing chambers travel bodily and the rods 23 and 31 move therewith.

Mounted on the rod 31 is a collar 34 which is free to turn on the rod but held from endwise movement by the two nuts 35 and 36. By adjusting the nuts 35 and 36, the collar may be shifted on the rod. A link 37 is pivoted to a lug 38 depending from this collar 34. This link 37 is also pivoted to a lever 39. The lever in turn is pivoted at 40 to the upper end of the bracket 7 and carries a roller 41 which is adapted to roll on the surface 42 of the sliding member 10. Said roller 41 enters a seat 43 in this member 10. When the two members 10 and 11 are moved away from each other to the extreme throw of the cams, the roller 41 will drop into the seat 43. On the other hand, when these slides move toward each other, the roller 41 will leave the seat 43 and ride up on the lever 42.

The can to be tested is placed on the supports 33 and 29 during the rotation of the carrier. This is accomplished by the cans passing through a runway 44 and dropping onto the support therefor as the support passes the end of the runway. The cans are caused to pass along the runway 44 by gravity. Suitable means may be provided and operated by the traveling carrier for releasing the cans only at the time when a testing station or device is opposite the end of the runway 44. The can falls onto the supporting brackets 29 and 33 and is properly centered relative to the chucks 27 and 30 so as to be engaged thereby as the carrier continues its rotation. While the can is moving to the position B in Fig. 1 of the drawings, the slide 10 is moved to the left through the action of the roller 13 in the cam groove 14 of the stationary member. This movement of the slide 10 will cause the roller 41 to ride up on the cam ledge 42 and move the chuck 30 so as to force the can against the elastic pad 28. The cans are so placed in the runways that, when they drop into the testing station, the open end of the can will be adjacent the elastic pad and, therefore, this movement of the chuck 30 will seat the open end of the can so tightly against the elastic pad as to seal the same.

The can is supplied with air from a suitable source of supply through a cone air valve 45 which directs the air out through suitable radial pipes 46 which are attached to the projecting rods 23, as indicated in Fig. 4 of the drawings. Each rod is provided with a central passage 47 which leads through the chuck 27 and elastic pad 28 to the interior of the can. Each can, after being put under air pressure, which takes place at the position indicated at C, will be held under air pressure until the testing station reaches the position G in its circular path of travel. While moving from the position C to D, the two halves of the testing chamber are moved toward each other until the gasket surfaces 22 are approximately one inch apart at the position indicated at E.

The can is chucked before the testing chamber passes beneath the surface of water in the tank 3. The two halves of the chamber are still slightly open, as stated, and therefore water will flow into the chamber and fill the chamber substantially full, the water surrounding the can which is being tested but not having access to the interior thereof. Between the positions E and F, the chamber becomes filled with water, the two gasketed surfaces meeting at the position F and said chambers are held pressed together with sufficient pressure to prevent leakage of the water enclosed in the chamber and surrounding the can. The two halves of the chamber remain in this relative position until they reach the position G. Between the positions G and H, the two halves of the chamber open to their extreme positions, and this will allow the water which was housed therein to flow out of the chamber. The movement of the slide 10 to the left will also cause the rod 31 carrying the chuck 30 to move to the right, and this will have released the can so that it is free to fall by gravity into the runway 47. A guide 48 carried by this runway lies in the path of travel of the can and between the supporting bracket arms 29 and 33, and this will cause the can to be forced out into the runway 47. The water flowing from the testing chamber will fall back into the tank 3.

In the end wall of the chamber portion 21 there is a movable piston or plunger 49. If a leaky can is housed in the testing chamber, the air within the can will escape through the leak as it is preferably under a pressure of about fifteen pounds to a square inch, and this will cause a pressure to build up in the water and in any small air pocket trapped in the water. This pressure on the water surrounding the can being tested will be transmitted through the water to the movable plunger or piston 49 and will force it outward to its extreme outer position.

Said plunger or piston is limited in its outward movement by a shoulder 50 on the plunger engaging a bushing 51 carried by the section 21 of the testing chamber. Said bushing has a small vent opening 52 so as to avoid any compression of air pocketed between the shoulder and the end of the chamber within which the piston is located. In the testing chambers where there is a leak in a can, the plunger or piston 49 will move outward to its limit and thus project from the end of the chamber. In all the chambers where there are no leaks, these plungers will be substantially housed within the end wall.

If the piston is in this extreme outward position while moving from the position G in Fig. 1 to the position H therein, said piston will engage a lever 53. This lever 53 is mounted on the end of a shaft 54, see Figs. 1 and 5. The shaft 54 is mounted in a bracket 55 carried by the wall of the tank 3. The plunger or piston 49 will engage a cam face 53ᵃ on this lever 53 and swing the shaft 54. If this piston or plunger 49 is retracted in case there is no leak in the can, then the lever 53 will not be engaged thereby.

The shaft 54 carries a face gear 56 which in turn meshes with a segment gear 57 carried by a shaft 58 on which is rigidly mounted an arm 59. The shaft 58 also has a portion meshing with another segment gear 60 mounted on a shaft 61 on which is likewise rigidly mounted an arm 62. The arm 59 carries a bar 63, while the arm 62 carries a bar 64. These two bars 63 and 64 form the bottom rails of a section of the runway 47. When these bars are in the position shown in Fig. 5, the cans dropping into the runway 47 will pass on down through the runway; these are perfect cans.

If, however, the lever 53 is swung by the plunger or piston 49 striking the same, it will move the arms 59 and 62 outwardly, and thus withdraw the bars or bottom rails 63 and 64 of this runway and will allow the can resting thereon to drop through onto a receiving plate 65; this is a leaky can, and will be directed by this plate into a suitable receptacle adapted to receive the same.

When the lever 53 is released from its operative engagement with the plunger or piston 49, a spring 66 will retract the same and thus move the bars 63 and 64 back to a position for forming the bottom of the runway 47. The plunger 49 is returned to its normal position and substantially housed in the traveling carrier through its engagement with a cam member 67 mounted on the lower end of the runway 44. This plunger or piston will remain retracted until again forced outwardly through the action of the air pressure escaping from a leak in the can during another testing operation.

From the above, it will be apparent that I have provided a method of testing cans for leaks wherein the cans to be tested are closed and subjected to air pressure and then surrounded with a non-compressible fluid, such as water, so that the pressure of the air escaping through the leak may be transmitted through this fluid to a suitable device which in turn operates mechanism for separating the leaky cans from the perfect cans. This method of testing is very simple and yet is very sensitive as only a slight pressure is required to move the piston or plunger 49. Inasmuch as the piston or plunger is moved through power transmitted through the fluid, the quantity of fluid is not essential except there is sufficient to transmit the pressure for moving the plunger or piston. If the testing chamber is not full of water and an air pocket forms for any reason, due to the trapping of the air in the chamber, the pressure of the air escaping through the leak will still operate in precisely the same way except the action will be slower to move the plunger or piston for ejecting the leaky can. Constant pressure is not essential and, therefore, if the air pressure in the plant varies, it will not in any way affect the testing apparatus. It will be noted that there is a passage in the wall of the portion 21 which leads into the chamber surrounding the can and the plunger 49 is located in this passage. The air escaping through a leak in a can will force the fluid in the chamber against the plunger and move the plunger outwardly in said passage, and fluid will be displaced from said chamber into said passage and thus move the plunger to a sufficient extent so that it will position the devices for separating the can having a leak from the perfect cans.

It is obvious that other ways may be devised for carrying out my method of testing cans for leaks than that which I have described in detail. It is also obvious that other devices may be substituted for those which have been set forth in detail, as long as said devices include means for supporting and closing the cans for testing and subjecting them to air pressure, and means also for forming a chamber for containing a non-compressible fluid, such as water, about the can that is to be tested, and utilizing the displacement of fluid from the chamber surrounding the can by the air escaping from the can into the fluid, for separating the can having a leak from the perfect can.

What is claimed as new is:—

1. The method of testing cans for leaks comprising closing a can for testing and subjecting the interior thereof to air pressure, surrounding said can with a non-compressible fluid whereby the pressure of any escaping air through a leak may be transmitted through said fluid to devices utilized for separating a leaky can from the perfect cans.

2. A machine for testing cans for leaks including means for supporting and closing a can for testing, means for subjecting said can to air pressure, means for forming about said can a chamber containing a non-compressible fluid, devices operated by the pressure of the air escaping through a leak in a can and transmitted through the fluid to said devices for separating said can having a leak from perfect cans.

3. A machine for testing cans for leaks including traveling means for supporting and closing a can for testing, means for subjecting said can to air pressure while the same is moving, means for forming about said traveling can a chamber containing a non-compressible fluid, devices associated with said chamber and operated by the pressure of the air escaping through a leak in a can and transmitted through the fluid to said devices for separating said can having a leak from the perfect cans.

4. A machine for testing cans for leaks including traveling means for supporting and closing a can for testing, means for subjecting said can to air pressure, means for forming about said can a chamber containing a non-compressible fluid, a device located in the wall of the chamber and moved outwardly by the pressure of the air escaping through a leak in a can within the chamber and transmitted through said fluid to said device, and mechanism operated by said device when in its outer position for separating said can having a leak from perfect cans.

5. A machine for testing cans for leaks including a traveling carrier, means mounted on said carrier for supporting and closing a can for testing, means for subjecting said cans to air pressure, a sectional chamber mounted on said carrier and adapted to form about said can a chamber containing a non-compressible fluid, a device mounted in the wall of said chamber and adapted to be moved outwardly by the pressure of air escaping through a leaky can and transmitted through the fluid to said device, and means adapted to be engaged by said device for separating said can having a leak from perfect cans.

6. A machine for testing cans for leaks including a rotating carrier, a series of means mounted thereon for supporting and closing cans for testing, means for subjecting said cans to air pressure, means for forming about each can a chamber containing a non-compressible fluid, means for opening said chambers and releasing the cans from the carrier, each chamber having a device adapted to be moved outwardly by the pressure of air escaping through a leak in a can and transmitted through the fluid to said device, means operated by said device when in its outward position for separating a can having a leak from the perfect cans.

7. A machine for testing cans for leaks including a rotating carrier for supporting and closing cans for testing, a tank adapted to contain a fluid through which said supporting means is passed by the rotation of the carrier, a sectional chamber for each supporting means mounted on the carrier, devices for closing the sectional chamber about a can and its supporting means when the supporting means and can are beneath the surface of the fluid, means for subjecting said can to air pressure while the sectional chamber is closed, a device mounted in said chamber and traveling therewith adapted to be operated by air pressure escaping through a leak in the can and transmitted through the fluid to said device, means for separating the sections of said chamber after the can has been subjected to air pressure a sufficient length of time to operate said device provided the can has a leak, means for releasing the cans from their supporting means after the chambers have been opened and for conveying the cans away from the carrier, and means operated by said device when in its outermost position for separating the leaky cans from the perfect cans passing away from said carrier.

8. A machine for testing cans for leaks including a rotating carrier for supporting and closing cans for testing, a tank adapted to contain a fluid through which said supporting means is passed by the rotation of the carrier, a sectional chamber for each supporting means mounted on the carrier, devices for closing the sectional chamber about a can and its supporting means when the supporting means and can are beneath the surface of the fluid, means for subjecting said can to air pressure while the sectional chamber is closed, a device mounted in said chamber and traveling therewith adapted to be operated by air pressure escaping through a leak in the can and transmitted through the fluid to said device, means for separating the sections of said chamber after the can has been subject to air pressure a sufficient length of time to operate said device provided the can has a leak, means for releasing the cans from their supporting means after the chambers have been opened and for conveying the cans away from the carrier, means operated by said device when in its outermost position for separating the leaky cans from the perfect cans passing away from said carrier, and means operating during the traveling of the carrier for returning said device to its innermost position after the cans have been released from their supporting means.

9. A machine for testing cans for leaks including a traveling carrier, said carrier having a series of can testing devices each including a sectional chamber, the sections of which are movable toward and from each other for closing the chamber and for opening the same, a can supporting means adapted to be enclosed within said chamber including a pad for closing the open end of the can and a movable member for forcing the open end of the can against said pad, means for subjecting said can to air pressure when said chamber is closed, means whereby said chamber may be moved beneath the surface of a fluid prior to the closing of the same whereby said chamber is filled with fluid, a member mounted in one section of said chamber and adapted to be moved outwardly by the pressure of air escaping through a leak in a can and transmitted through said fluid to said member, means for moving the sections to close said chamber and to separate the sections to discharge the can after it has been tested, one of said movable sections having means for releasing the cans from its support when the sections are separated, and devices associated with the traveling carrier and operated by said projecting member for separating a leaky can from a perfect can.

10. A can testing machine comprising a rotating carrier, stationary cams associated with said carrier, devices mounted on the carrier and movable by said stationary cams toward and from each other, each of said devices including a section of a chamber adapted when closed to enclose a can being tested, means for supporting the can to be tested in said chamber including a movable chucking member, a rod extending through the end of one of said sections of the chamber on which said member is mounted, a link adjustably connected to said rod, a lever to which said link is pivoted, said lever being pivotally mounted on said carrier, the movable device carrying one section of the chamber being constructed so as to engage the end of said lever and move the same for clamping the can in position to be tested and for holding the can in said clamped position.

11. In a can testing machine, a chamber within which the can to be tested is mounted, said machine including means for surrounding the can in said chamber with a non-compressure fluid, means for supporting and closing the can in said chamber, means for subjecting the can to air pressure, a plunger mounted in one wall of said enclosing chamber and adapted to be operated by the pressure of the air escaping through a leak in a can and transmitted to said plunger by the fluid surrounding the can, said plunger having a shoulder for limiting the outward movement thereof.

12. In a can testing machine, a chamber within which the can to be tested is mounted, said machine including means for surrounding the can in said chamber with a non-compressible fluid, means for supporting and closing the can in said chamber, means for subjecting the can to air pressure, a plunger mounted in one wall of said enclosing chamber and adapted to be operated by the pressure of the air escaping through a leak in a can and transmitted to said plunger by the fluid surrounding the can, said plunger having a shoulder for limiting the outward movement thereof, a traveling carrier on which said chamber is mounted, a lever lying in the path of travel of said plunger, and devices operated thereby for separating a can having a leak from the perfect cans.

13. In a can testing machine, a chamber within which the can to be tested is mounted, said machine including means for surrounding the can in said chamber with a non-compressible fluid, means for supporting and closing the can in said chamber, means for subjecting the can to air pressure, a plunger mounted in one wall of said enclosing chamber and adapted to be operated by the pressure of the air escaping through a leak in a can and transmitted to said plunger by the fluid surrounding the can, said plunger having a shoulder for limiting the outward movement thereof, a traveling carrier on which said chamber is mounted, a lever lying in the path of travel of said plunger, devices operated thereby for separating a can having a leak from the perfect cans, and a cam adapted to engage said plunger and return the same to its normal retracted position after the cans have been released from the supporting means therefor and discharged from the carrier.

14. A machine for testing cans for leaks including means for supporting and closing a can for testing, means for subjecting said cans to air pressure, means for forming about said can a chamber containing a non-compressible fluid, the wall of said chamber having a passage leading into said chamber, and means, operated by the displacement of fluid from said chamber into said passage by air escaping from the can through a leak therein into the fluid, for separating the can having a leak from the perfect cans.

In testimony whereof, I affix my signature.

JAMES H. O'NEIL.